United States Patent [19]

Hofmann

[11] 4,416,319
[45] Nov. 22, 1983

[54] CLOSURE FOR TIRE CHAINS

[75] Inventor: Peter Hofmann, Aalen-Unterkochen, Fed. Rep. of Germany

[73] Assignee: RUD-Kettenfabrik Rieger & Dietz GmbH u. Co., Aalen, Fed. Rep. of Germany

[21] Appl. No.: 401,339

[22] Filed: Jul. 23, 1982

[30] Foreign Application Priority Data

Jul. 24, 1981 [DE] Fed. Rep. of Germany ....... 3129907

[51] Int. Cl.³ .............................................. B60C 27/00
[52] U.S. Cl. ............................. 152/213 R; 24/68 TT; 24/116 R; 24/697; 152/172; 152/217; 152/231; 152/233; 152/241; 24/701
[58] Field of Search ............... 152/213 R, 213 A, 217, 152/218, 219, 233, 241, 242, 220, 231, 234–240, 172, 174, 175, 177, 179, 182, 183, 184, 187, 189, 191; 24/68 TT, 68 CT, 299, 116 R, 201 L; 279/24; 59/93

[56] References Cited

U.S. PATENT DOCUMENTS

| 2,130,293 | 9/1938 | Bonforte ..................... 152/213 R X |
| 2,834,391 | 5/1958 | Hellman ......................... 152/213 R |
| 3,893,499 | 7/1975 | von der Hellen .............. 152/213 A |
| 4,269,249 | 5/1981 | McLean ......................... 152/213 A |
| 4,274,463 | 6/1981 | Freeman ........................ 152/213 R |

Primary Examiner—William A. Powell
Assistant Examiner—Thomas Bokan
Attorney, Agent, or Firm—Parmelee, Bollinger & Bramblett

[57] ABSTRACT

In tire chains, closures are required to lock tension-chain lines (10) in the tensioned position. A proposed closure is provided with a pull-through orifice (2) for the tension-chain line (10) and with a locking slot (3) adjacent to the pull-through orifice (2). To prevent the particular chain link (9) suspended in the locking slot (3) from working loose, the pull-through orifice (2) is equipped with an elastic insert (11) which forms at least one engagement cam projecting into the locking slot (3).

22 Claims, 7 Drawing Figures

CLOSURE FOR TIRE CHAINS

BACKGROUND OF THE INVENTION

The invention relates to a closure for tyre chains, especially non-skid chains, with a basic body with at least one connecting lug for the end member of a retaining line and with a pull-through orifice having an elastic insert for a tension-chain line, as well as with a locking slot adjacent to the pull-through orifice for locking the tension-chain line.

A known closure of the above mentioned type, which consists of a simple stamped constructional part, has a central circular pull-through orifice and a locking slot adjacent to this. In this closure, the function of the elastic insert is to make it easier for the chain links to slide through the pull-through orifice. The known closure is unsatisfactory in as much as, when they are pulled through the pull-through orifice, the chain links of the tension-chain line are inclined to catch in the region of the mouth of the locking slot unwantedly, on the other hand there is relatively great danger that the particular chain link suspended on purpose in the locking slot will work loose unintentionally.

SUMMARY OF THE INVENTION

The object on which the invention is based is to provide a closure of the type under consideration, in which a tension-chain line can be pulled through the pull-through orifice without its chain links being unwantedly caught, and in which there is a guarantee of good retention of the particular chain link suspended on purpose in the locking slot.

This object is achieved, according to the invention, due to the fact that the insert overlapping the basic body on both sides by means of retaining shoulders forms at least one engagement cam narrowing the mouth of the locking slot, for the elastic clamping of a leg of a chain link of the tension-chain line, this leg being introduced into the locking slot by overcoming the engagement cam.

The closure according to the invention offers the advantage that the narrowing of the locking slot in the mouth region prevents the tension-chain line from being caught in the locking slot when pulled through the pull-through orifice, on the one hand, and gives a guarantee of good retention of a leg of a chain link of the tension-chain line suspended in the locking slot, on the other hand. In other words, the engagement cam fulfills a double function. In addition, the elastic insert makes it easier to pull the tension-chain line through the pull-through orifice because by means of its retaining shoulders it enlarges the bearing surface for the chain links of the tension-chain line.

BRIEF DESCRIPTION OF THE DRAWINGS

Further features and details of the invention emerge from the sub-claims and from the following description of an exemplary embodiment illustrated in the attached drawing in which:

DETAILED DESCRIPTION OF THE PREFERRED EMBODIMENT

Figure 1:
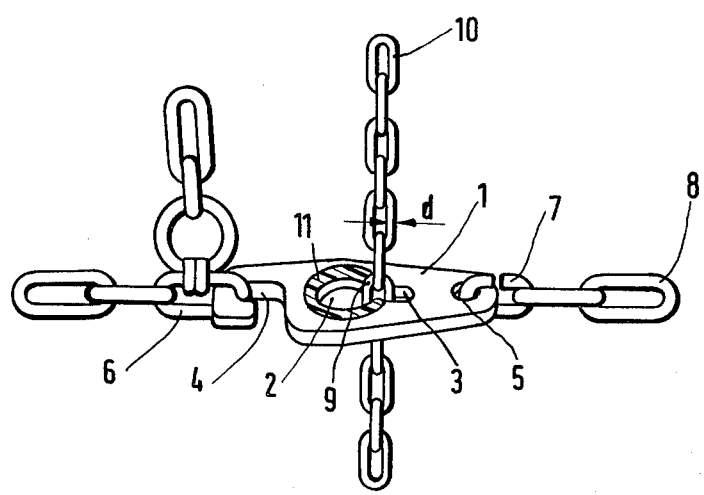
FIG. 1 shows a perspective view of a closure arranged on a tyre chain.

The closure consists of a basic body 1 which consists of a stamped part and which is provided with a pull-through orifice 2 and a locking slot 3 adjacent to the latter. At one end the basic body 1 is provided with a hook-shaped connecting lug 4 and at the other end with an annular connecting lug 5 for end members 6 and 7 of a retaining line 8. A chain link 9 of a tension-chain line 10 is suspended in the closure. The chain links 9 of the tension-chain line have legs, the thickness of which is equal to d.

Figure 3:
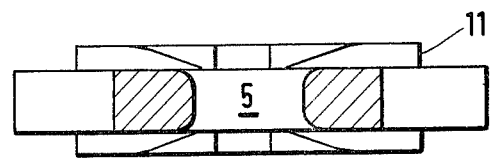
FIG. 3 shows a section along the line III—III in FIG. 2.
Figure 2:
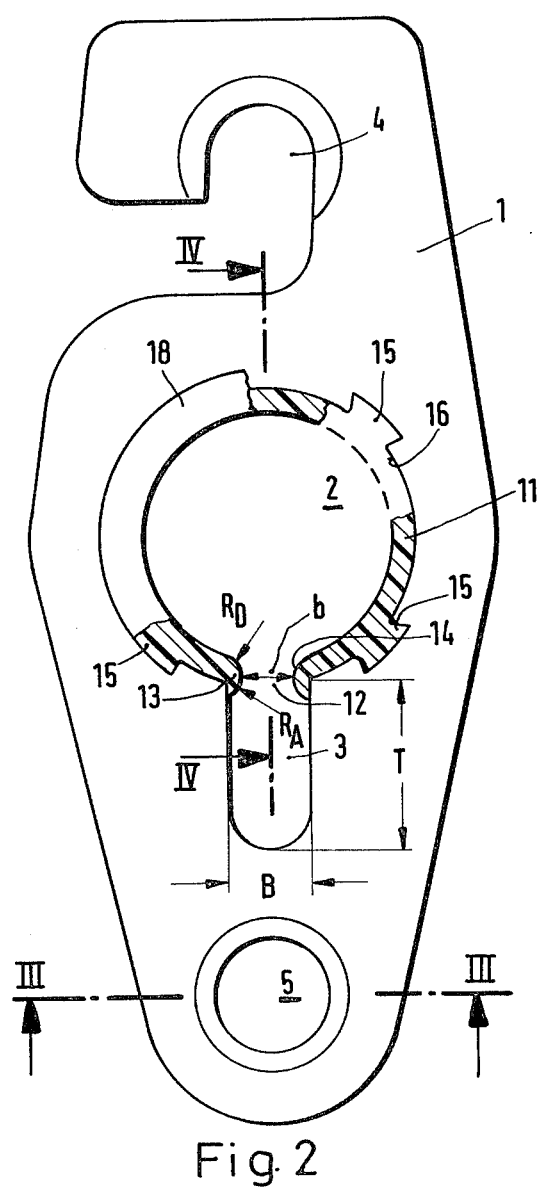
FIG. 2 shows a plan view of the closure.

Details of the closure emerge from FIGS. 2 to 3. It will be seen that the pull-through orifice 2 is lined with an elastic insert 11 which forms engagement cams 13 and 14 projecting into the region of the mouth 12 of the locking slot 3.

In practise, the insert 11 is formed by a ring injected into the insertion orifice 2 and provided with a slit. It consists of a low-pressure polyethylene of high resistance to wear. The insert should be contrasted from the basic body in its colour. Appropriately, it consists of a reflecting or fluorescent material.

To ensure that the insert 11 is anchored in a rotation-proof manner in the basic body 1 of the closure, the basic body 1 consisting of a stamped part is provided with several engagement grooves for the insert 11. The engagement grooves are formed by dovetailed portions 15 stamped out of the edge of the receptacle 16 for the insert 11. In the case illustrated, the receptacle 16 has four engagement grooves, at least two of which are located in the vicinity of the mouth 12 of the locking slot 3.

To secure the insert 11 also against displacements perpendicular to the plane of the basic body 1, it is provided with retaining shoulders 17 and 18, which overlap the basic body on both sides and which are designed like flanges. The width b of the locking slot 3 in the region of the engagement cams is approximately equal to 0.9 times the thickness d of the legs of the chain links 9 of the tension-chain line 10. On the other hand, the depth of the locking slot 3 is equal to 2-2.5 times the thickness d of the legs of the chain links 9 of the tension-chain line 10. A choice of the slot depth mentioned ensures that only one leg of the particular chain link 9 is blocked. If both legs were blocked, that is to say if the depth T were substantially greater, then it would undesirably become more difficult to release the tension-chain line. Outside the region of the engagement cams 13 and 14, the width B of the locking slot 3 is approximately equal to 1.2-1.4 times the thickness d of the legs of the chain links 9 of the tension-chain line 10. The radii of curvature $R_A$ and $R_D$ of the engagement cams 13 and 14 also deserve attention. The radius of curvature $R_A$ of the engagement cams 13 and 14, which faces the bottom of the locking slot 3, should be greater than the radius of curvature $R_D$ facing the pull-through orifice 2. It is appropriate if the radius of curvature $R_A$ is equal to half the thickness d of the chain links 9 and if the radius of curvature $R_D$ facing the pull-through orifice 2 is equal to one third of the thickness d of the legs of the chain links 9 of the tension-chain line 10.

Figure 4:
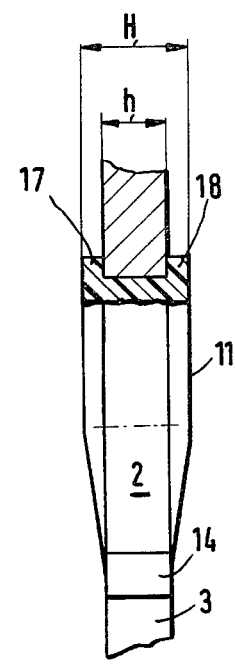
FIG. 4 shows a section along the line IV—IV in FIG. 2.

The height H of the insert 11 should be at least 1.3 times the height h of the basic body 1. This, in turn, is advantageously equal to the thickness d of the legs of the chain links 9 of the tension-chain line 10. It is especially advantageous if the greatest height H, that is to say the height of the part of the insert located outside the mouth region, is 1.5 to 2 d. In the region of the mouth 12 of the locking slot 13, the insert is flattened towards the basic body, and this can best be seen in FIG. 4.

Figure 5:
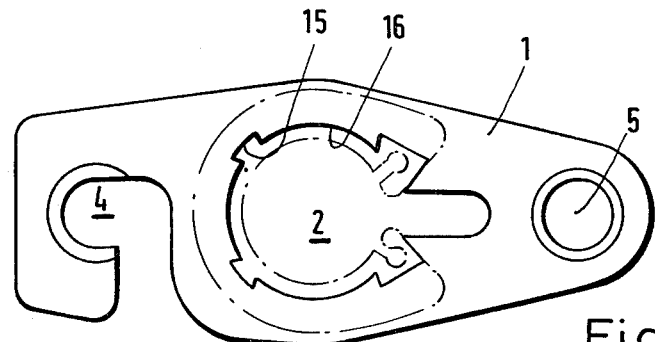
FIG. 5 shows a plan view of a basic body of a closure with a modified insert.
Figure 6:
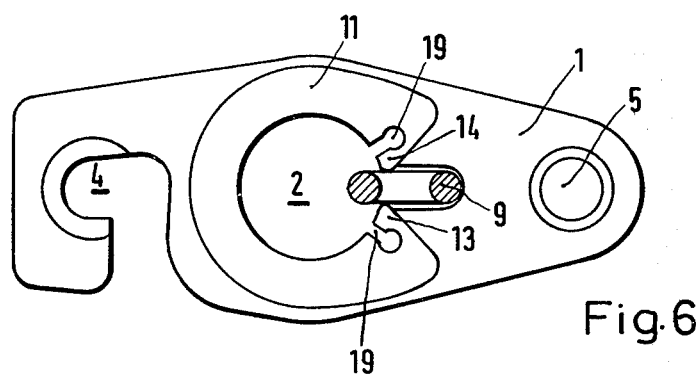
FIG. 6 shows the basic body according to FIG. 5 provided with an insert.
Figure 7:
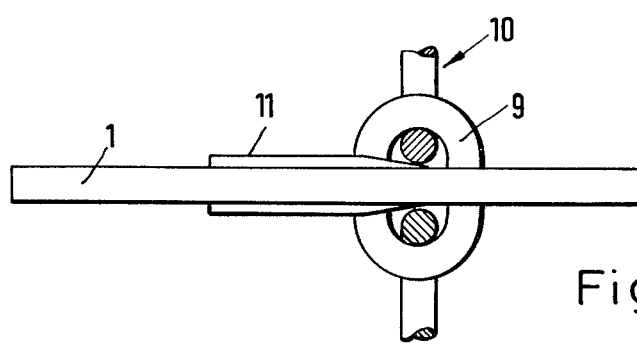
FIG. 7 shows a side view of the closure according to FIG. 6.

A modified closure is illustrated in FIGS. 5 to 7 in which parts corresponding to parts of the first exemplary embodiment bear the same reference numerals as in FIGS. 1 to 4. In the second exemplary embodiment, two comparatively large stamped-out edge portions 15 are located in direct proximity to the locking slot 3. As a result, it becomes possible to provide the insert 11, in the region of the mouth 12, with deflection notches 19 for the engagement cams 13, 14. The engagement cams 13, 14 thus constitute, so to speak, the ends of short leaf springs. The spring effect achieved allows the insert to be made of a material of comparatively great hardness.

The closure described is distinguished not only by its good mode of operation, but also by its simplicity and economical production. It can be manufactured in large quantities at a low outlay. By the choice of a suitable material for the insert 11, the conditions of friction between the tension-chain line 10 and the closure can be influenced favourably in a way which makes it easier to pull the tension-chain line through the pull-through orifice 2.

I claim:

1. Closure for tyre chains, including non-skid tyre chains, with a basic body with at least one connecting lug for the end member of a retaining line and with a pull-through orifice having an elastic insert for a tension-chain line, as well as with a locking slot adjacent to this pull-through orifice for locking the tension-chain line, characterised in that the insert (11) overlapping the basic body (1) on both sides by means of retaining shoulders (17, 18) forms at least one engagement cam (13, 14) narrowing the mouth (12) of the locking slot (3), for the elastic clamping of a leg of a chain link (9) of the tension-chain line (10), this leg being introduced into the locking slot (3) by overcoming the engagement cam (13, 14).

2. Closure according to claim 1, characterised in that the insert (11) is formed by a ring injected into the pull-through orifice (2) and provided with a slit.

3. Closure according to claim 1, characterized in that the insert (11) is formed from polyethylene.

4. Closure according to claim 1, characterised in that the insert (11), is anchored in a rotation-proof manner in the basic body (1) of the closure.

5. Closure according to claim 4, characterised in that the basic body (1) includes a stamped part which is provided with engagement grooves for the insert (11).

6. Closure according to claim 5, characterised in that the engagement grooves are formed by dovetailed portions (15) stamped out of the edge of the receptacle (16) for the insert (11).

7. Closure according to claim 4, characterised in that the receptacle (16) has at least two engagement grooves.

8. Closure according to claim 7, characterised in that two engagement grooves are located in the vicinity of the mouth (12) of the locking slot (3).

9. Closure according to claim 1, characterised in that the retaining shoulders (17, 18) are designed like flanges.

10. Closure according to claim 1, characterised in that the width (b) of the locking slot (3) in the region of the engagement cams is approximately equal to 0.9 times the thickness (d) of the legs of the chain links (9) of the tension-chain line (10).

11. Closure according to claim 1, characterised in that the depth (T) of the locking slot (3) is equal to 2 to 2.5 times the thickness (d) of the legs of the chain links (9) of the tension-chain line (10).

12. Closure according to claim 1, characterised in that outside the region of the engagement cams the width (B) of the locking slot (3) is approximately equal to 1.2 to 1.4 times the thickness (d) of the legs of the chain links (9) of the tension-chain line (10).

13. Closure according to claim 1, characterised in that the radius if curvature ($R_A$) of the engagement cams (13, 14), which faces the bottom of the locking slot (3) is greater than their radius of curvature ($R_D$) facing the pull-through orifice (2).

14. Closure according to claim 13, characterised in that the radius of curvature ($R_A$) facing the bottom of the locking slot (3) is equal to half the thickness (d) and the radius of curvature ($R_D$) facing the pull-through orifice (2) is equal to one third of the thickness (d) of the legs of the chain links (9) of the tension-chain line (10).

15. Closure according to claim 1, characterised in that the greatest height (H) of the insert (11) is approximately equal to 1.3 times the height (h) of the basic body (1) of the closure.

16. Closure according to claim 15, characterised in that the height (h) of the basic body (1) is equal to the thickness (d) of the legs of the chain links (9) of the tension-chain line (10).

17. Closure according to claim 15, characterised in that the height (H) of the insert (11) decreases towards the mouth (12) of the locking slot (3).

18. Closure according to claim 1, characterised in that the greatest height (H) of the insert (11) is at least equal to one and a half times and at most equal to twice the thickness (d) of the legs of the chain links (9) of the tension-chain line.

19. Closure according to claim 1, characterised in that the insert (11) is provided, in the region of the mouth (12) of the locking slot (3), with deflection notches (19) for the engagement cams (13, 14).

20. Closure according to claim 1, characterised in that the insert (11) has a colour contrasting with the colour of the basic body (3).

21. Closure according to claim 20, characterised in that the insert (11) is made reflecting.

22. Closure according to claim 20, characterised in that the insert (11) is made fluorescent.

* * * * *